3,170,888
LATICES OF VINYLIDENE CHLORIDE INTERPOLYMERS THICKENED WITH ETHYLENE-MALEIC ANHYDRIDE COPOLYMER AND ARTICLE COATED THEREWITH
Leon Kutik, Bronx, Francis W. Michelotti, Brooklyn, Sebastian T. Brancato, Queens Village, and Alice W. Pucknat, New York, N.Y., assignors to Interchemical Corporation, New York, N.Y., a corporation of Ohio
No Drawing. Filed Aug. 31, 1962, Ser. No. 220,872
12 Claims. (Cl. 260—29.6)

This invention relates to latices of vinylidene chloride interpolymers and more particularly to a thickened latex of an interpolymer of vinylidene chloride, an acrylate ester, and methacrylic acid and to articles coated therewith.

The coating and impregnation of paper and other sheet materials with plastics to improve physical properties or to impart valuable surface effects is now practiced on a large scale. Coatings applied as solutions are satisfactory for some end uses but not for others. Limitations of various types are encountered. The polymers cannot be of too high a molecular weight, since the solubility then diminishes. Application of solution coatings to porous materials is often accompanied by "strikethrough," meaning undesired penetration of the solvent and the polymer into or even through the web, thus causing discontinuity in the coating film and sometimes discoloration on the reverse surface. In all cases the use of organic solvents has the known disadvantages of expense, flammability, odor, and sometimes toxic vapors.

By using latices comprising dispersions of high polymers in water it is possible to overcome some of the undesirable properties of polymer solutions. Organic solvents are thereby dispensed with and polymers of high molecular weight may be applied. Furthermore, emulsion techniques avoid the expense of isolating the polymers from the polymerization system. In emulsion polymerization, thermal control is comparatively easy, each small particle being surrounded by water, also the moderate viscosity allows good heat transfer to the kettle jacket. Polymers of high molecular weight can thus be obtained with a much shorter reaction time than by bulk polymerization, the difference being a few hours versus a few days.

When the continuous phase of such an emulsion is in substantial excess, the viscosity of the emulsion is essentially that of the liquid. As the amount of discontinuous phase increases, the viscosity increases until the emulsion no longer flows. At the point where the volume of the internal phase exceeds that of the external phase, the crowding together of the particles produces a "structural viscosity" component in the overall apparent viscosity. Under these circumstances particle size, electrical charges, "lubricant" films on the particles, etc. become important. Theoretically, the maximum volume that can be occupied by uniform spherical particles in the dispersed phase of an emulsion comprises 74% of the total volume. Although some emulsions may be prepared having as high as 99% dispersed phase, considerable distortion of the squeezed-together particles at these high ratios results. Emulsion viscosity often changes with age, sometimes owing to thixotropic action. Stability in general depends upon particle size, difference in density of the phases, the viscosity of the continuous phase, the viscosity of the completed emulsion, and the electrical charge on the particles, as well as upon the nature, effectiveness, and quantity of emulsifier used. Conditions of storage, including high and low temperatures, agitation and vibration, dilution or evaporation, all may play their part in changing the properties and make-up of the emulsion. The same factors may also come into play during coating operations. The stability, in fact, is determined by almost all factors involved in the formulation and preparation of an emulsion. The viscosity of an emulsion may often be lowered by increasing the ratio of the continuous phase to the disperse phase. Similarly it may often be increased by decreasing this ratio. Increase in viscosity also may be brought about by addition of thickeners such as soap gels, lipophilic fatty acid ester, gums, or alumina gel to the continuous phase. The reduction of clumping or of particle size often has the same effect. The introduction of air bubbles as a third phase has a tendency to increase the viscosity, but such a procedure must be used with caution since such systems may be quite unstable.

Although these general lines of attack are known, the actual tailoring of an emulsion to fit a number of requirements, some unrelated to one another, is very difficult and sometimes seemingly impossible. The imparting of one desirable property may entrain the impairment of other desirable properties. The methods of altering viscosity mentioned above, while qualitatively correct, may produce such small changes that no practical end is achieved. Each particular emulsion presents a new problem.

On non-porous substrates such as glassine, Mylar, cellophane, and other flexible packaging films there is a decided tendency for unthickened latices to flow excessively and even crawl without wetting the substrate. The thickened latices of the present invention completely overcome this tendency and film having the desired properties is obtained. Furthermore, multiple coats may be applied with complete drying between each application. This is not possible with unthickened or inadequately thickened latices, which exhibit crawling when more than one coating is applied.

The preferred latices of this invention are prepared by redox emulsion polymerization of about 80% to 87% by weight of vinylidene-chloride, about 9% to 18% by weight of ethyl acrylate, and about 1% to 4% by weight of methacrylic acid, the solid content being about 40%–60% by weight. Thickener is added to the amount of 0.6 to 2.7% parts by weight, based on the weight of latex solids. The preferred thickener is a linear ethylene-maleic acid copolymer of high molecular weight having the recurrent group

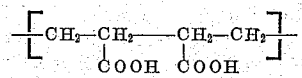

and is also known as "DX-840-32." Its specific viscosity is 1.0 when determined on a 1% solution of the resin in dimethyl formamide at 25° C. The similar ethylene-maleic-anhydride copolymer, also known as "DX-840-31," is equally good provided it is first hydrolyzed to the acid form. Hydrolysis is conveniently carried out by heating a slurry of the solid in water 10–15 minutes at 95° C. and cooling the solution. Any other suitable method of hydrolysis may also be used. The addition of these thickeners did not increase the moisture vapor transmission rate over that of the unthickened latices in cured film form. Their resistance to moisture transmission is at least as high as that of the best prior art films.

Other thickeners, such as (a) ammonia, (b) the sodium salt of carboxy methyl cellulose, also known as "Cellulose Gum," (c) hydroxy ethyl cellulose, also known as "Cellosize," (d) polyethylene oxide gum, also known as "Polyox," (e) the polymer produced by reacting 100 parts by weight of acrylic acid with 1 to 2 parts by weight of allyl sucrose (containing 5.6–5.8 allyl groups per molecule), also known as "Carbopol 934," (f) linear maleic anhydride copolymers of lower molecular weights than "DX–840–31," either hydrolyzed or unhydrolyzed, (g) crosslinked ethylene-maleic anhydride copolymers of various molecular weights, (h) crosslinked ethylene-maleic acid copolymers of lower molecular weights than "DX–840–32," (i) crosslinked ammonium-amide forms of ethylene-maleic acid copolymers of various molecular weights, (j) linear ammonium-amide forms of ethylene-maleic acid copolymers of various molecular weights, (k) linear ethylene-maleic acid copolymers of various molecular weights, (l) methyl cellulose, and (m) carboxy-methyl hydroxyethyl cellulose were unsuccessful owing to incompatibility, poor thickening, or increase in water vapor transmission rate.

*Example*

1500 g. water, 40 g. "Duponol C," 6 g. ammonium persulfate, 212.5 g. vinylidene chloride, 27.5 g. ethyl acrylate, and 10 g. methacrylic acid were heated to 30° C. 3 g. sodium metabisulfite were then added and the mixture refluxed at 36° C. 637.5 g. vinylidene chloride, 82.5 g. ethyl acrylate, and 30 g. methacrylic acid were added dropwise over a period of 1½ hours, the temperature being kept at 35–38° C. After the addition, the temperature was raised to 40° C. The material was then cooled and filtered. It had a solids content of 41.3% by weight. The latex was thickened to a value of 300 centipoises with a 10% solution of DX–840–32. 2% by weight of solid DX–840–32, based on the latex solids was required.

The preferred type of thickened latex showed changes in viscosity when aged over a week, but shielding it from ultraviolet radiation, for instance by storing in amber bottles, improved the aging stability somewhat.

Considerable improvement in stability was attained by distributing the "Duponol C" proportionately between the initial charge in the flask and the material added dropwise. The solids content was varied from about 40% to about 60%. The example above thus was varied by having only 10 g. of "Duponol C" in the original charge, the other 30 g. being mixed with the monomers that were added dropwise. It was also found that sodium lauryl sulfate was more effective than many other commercial emulsifiers tried such as "Brij 35," "Triton X–205," "Triton X–305," "Triton X–405," "Aerosol OT," "Tergitol NPX," "Hyamine 1622," "Duponol ME," "Brij 30," "Triton X–200," "Tergitol XD," "Tergitol 08," "Onyx 132 D," "Garfac RE 610," "Garfac RM 710," "Garfac GB 520," "Garfac LO 529," "Triton, 770 conc.," "Garfac PE 510," "Garfac RM 510," and "OPE–70." "Duponol C" is sodium lauryl sulfate.

The latices of the present invention displayed an unusual number of desirable properties and were thus found to be superior over the prior art latices used for the same type of applications. Cured films made therefrom had superior impermeability to water vapor and gases, a feature of considerable importance commercially. In packaged goods, it is often desirable to prevent access of air and loss (or gain) of moisture. The films also imparted good grease proofing, even on scored areas. They had excellent flexibility and resistance to blocking. Adhesion to non-porous substrates was outstanding. They are therefore of particular value in coating food packaging materials.

Coatings may be applied by conventional methods such as reverse roller coating. They may be cured simply by air drying but, since speed is generally desirable, heating is preferable. At 300° F. 1 minute is sufficient and at 150° F. 10 minutes are required. The thickened latex was superior to the unthickened latex in being easier to apply to paper, etc., giving a more uniform film free from craters or pinholes, and having less "strike-in." It also had better clarity than any commercially available vinylidene chloride latex examined.

Incorporation of ½–3% by weight of a "Carbowax," based on the weight of resin solids, increased the stability of the latices at least 10%.

One drawback of all the foregoing embodiments of this invention is the fact that when aluminum or various steels are in contact with the above latices, appreciable corrosion is observed to have taken place within 2 to 3 hours. Surprisingly, such corrosion can be effectively prevented by incorporating up to about 2% by weight, based on resin solids, of ethylenediamine tetraacetic acid (EDTA) in the latices. For example, aluminum and various steels that showed appreciable corrosion after 2 to 3 hours' contact with the latices, showed negligible, if any, corrosion after 336 hours' contact with the same latices to which 1% by weight of EDTA, based on resin solids, had been added. The latices containing EDTA have a pH value of 2.0, thus their greatly decreased corrosive effect is totally unexpected.

"Carbowax" is a poly (ethylene ether) glycol. The preferred types are those having molecular weights in the range 300–1500.

What is claimed is:

1. A coating composition comprising a thickened latex consisting essentially of an aqueous dispersion of an interpolymer made from about 80% to about 87% by weight of vinylidene chloride, about 9% to about 18% by weight of ethyl acrylate, and about 1% to 4% by weight of methacrylic acid, the latex containing about 0.6 to 2.7 parts by weight, based on the latex solids, of a thickener consisting of a linear ethylene-maleic acid copolymer having the recurrent group.

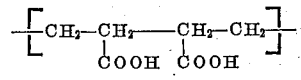

and having a specific viscosity of 1.0 when determined on a 1%-by-weight solution of the copolymer in dimethyl formamide at 25° C., the solids content of the latex being about 40% to about 60% by weight.

2. A coating composition comprising a thickened latex consisting essentially of an aqueous dispersion of an interpolymer made from about 85% by weight of vinylidene chloride, about 11% by weight of ethyl acrylate, and about 4% by weight of methacrylic acid, the latex containing about 2% by weight, based on the latex solids, of a thickener consisting of a linear ethylene-maleic acid copolymer having the recurrent group

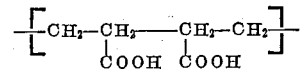

and having a specific viscosity of 1.0 when determined on a 1%-by-weight solution of the copolymer in dimethyl formamide at 25° C., the solids content of the latex being about 50% by weight.

3. A mixture of the coating composition of claim 1 and ½ to 2% by weight, based on the weight of resin solids, of ethylenediamine tetraacetic acid.

4. A mixture of the coating composition of claim 2 and ½ to 2% by weight, based on the weight of resin solids, of ethylenediamine tetraacetic acid.

5. A mixture of the coating composition of claim 3 and ½ to 3% by weight, based on the weight of resin solids, of poly(ethylene ether) glycol.

6. A mixture of the coating composition of claim 4 and ½ to 2% by weight, based on the weight of resin solids, of poly(ethylene ether) glycol.

7. A non-metallic substrate having coated thereon a film comprising the cured coating composition of claim 1.

8. A non-metallic substrate having coated thereon a film comprising the cured coating composition of claim 2.

9. A non-metallic substrate having coated thereon a film comprising the cured coating composition of claim 3.

10. A non-metallic substrate having coated thereon a film comprising the cured coating composition of claim 4.

11. A non-metallic substrate having coated thereon a film comprising the cured coating composition of claim 5.

12. A non-metallic substrate having coated thereon a film comprising the cured coating composition of claim 6.

References Cited in the file of this patent
UNITED STATES PATENTS
2,840,491　　Grenley et al. _____ June 24, 1958

OTHER REFERENCES

Monsanto Product Information Bulletin No. 1066, "Water Soluble Copolymers of Ethylene Maleic Anhydride," 1959 (pages 1, 5, and 8 relied upon).